(12) United States Patent
Clark et al.

(10) Patent No.: US 9,651,425 B2
(45) Date of Patent: May 16, 2017

(54) COLOR SENSOR

(75) Inventors: Stephan R. Clark, Albany, OR (US); Brett E. Dahlgren, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1349 days.

(21) Appl. No.: 13/201,213

(22) PCT Filed: Feb. 27, 2009

(86) PCT No.: PCT/US2009/035454
§ 371 (c)(1),
(2), (4) Date: Aug. 11, 2011

(87) PCT Pub. No.: WO2010/098766
PCT Pub. Date: Sep. 2, 2010

(65) Prior Publication Data
US 2011/0310389 A1 Dec. 22, 2011

(51) Int. Cl.
G01J 3/51 (2006.01)
G01J 3/02 (2006.01)
G01J 3/28 (2006.01)
G01J 3/50 (2006.01)

(52) U.S. Cl.
CPC . *G01J 3/51* (2013.01); *G01J 3/02* (2013.01); *G01J 3/027* (2013.01); *G01J 3/0291* (2013.01); *G01J 3/2803* (2013.01); *G01J 3/50* (2013.01); *G01J 3/513* (2013.01)

(58) Field of Classification Search
CPC ............ G01J 3/50–3/513; G01J 3/2803; B41F 33/0036
USPC .................. 356/416, 419, 425; 250/200, 226
See application file for complete search history.

(56) References Cited

U.S. PATENT DOCUMENTS

| | | | | | |
|---|---|---|---|---|---|
| 2,429,849 | A | * | 10/1947 | Somers | 348/270 |
| 4,003,660 | A | * | 1/1977 | Christie et al. | 356/407 |
| 4,870,483 | A | * | 9/1989 | Nishigaki et al. | 358/512 |
| 5,903,388 | A | * | 5/1999 | Sedlmayr | 359/283 |
| 5,917,621 | A | * | 6/1999 | Yushiya | 358/518 |
| 6,100,982 | A | * | 8/2000 | Tobias et al. | 356/617 |

(Continued)

FOREIGN PATENT DOCUMENTS

| | | |
|---|---|---|
| CN | 1951105 A | 4/2007 |
| JP | 2004155140 A | 6/2004 |

(Continued)

OTHER PUBLICATIONS

Korean Intellectual Property Office, International Search Report, Nov. 24, 2009, 3 pages, Daejeon, Republic of Korea.

*Primary Examiner* — Kara E Geisel
*Assistant Examiner* — Shawn Decenzo
(74) *Attorney, Agent, or Firm* — HP Inc. Patent Department

(57) ABSTRACT

A color sensor array includes a plurality of sensors. Each of the plurality of sensors has a width dimension and a length dimension that is elongated with respect to the width dimension. The length dimensions of the sensors are substantially equal to one another and parallel to an illumination plane. Each of the plurality of sensors includes a face defined by opposing first and second elongated sides and opposing first and second non-elongated sides. The first non-elongated sides of the plurality of sensors are aligned with one another along an axis that is substantially perpendicular to the illumination plane.

12 Claims, 7 Drawing Sheets

(56) References Cited

U.S. PATENT DOCUMENTS

| | | | |
|---|---|---|---|
| 6,133,706 A | 10/2000 | Quintana | |
| 6,517,180 B2 | 2/2003 | Tullis et al. | |
| 6,693,658 B2 * | 2/2004 | Ishikawa et al. | 347/236 |
| 6,844,931 B2 * | 1/2005 | Ehbets | 356/328 |
| 7,275,799 B2 | 10/2007 | Hayashi et al. | |
| 7,643,141 B2 * | 1/2010 | Shirai et al. | 356/239.2 |
| 7,701,580 B2 * | 4/2010 | Bassler et al. | 356/419 |
| 8,279,441 B2 * | 10/2012 | Brown et al. | 356/407 |
| 2009/0090849 A1 * | 4/2009 | Chen | 250/226 |

FOREIGN PATENT DOCUMENTS

| | | |
|---|---|---|
| JP | 2005271369 A | 10/2005 |
| KR | 2005271369 A | 5/2005 |

\* cited by examiner

COLOR SENSOR

BACKGROUND

Color sensors are utilized in printing systems to detect color reproduction accuracy. In operation, light reflected from a sample formed on a print medium is captured by a sensor array. The output from the array is analyzed to identify the color of the sample. System parameters may be adjusted when the identified color differs from that which is expected. While samples of identical color may be formed on two different print media, certain events can cause color sensor to identify the two samples as being of different colors causing the printing system to make unnecessary and perhaps undesirable corrections. For example, the samples may be formed on print media of different thicknesses such that the second sample is positioned closer to the sensor array. The differing positions, absent correction, may cause the two samples to be identified being of different colors. In another example, the samples may be formed on two different types of print media having differing scattering profiles. For example, one sample may be formed on glossy paper while the second is formed on paper having a matte finish. The differing scattering profiles, absent correction, may cause the two samples to be identified being of different colors.

DRAWINGS

DESCRIPTION

While samples of identical color may be formed on two different print media, certain events can cause a color sensor to identify the two samples as being of different colors causing a printing system to make unnecessary and perhaps undesirable corrections. Examples of such events include forming the two samples on print media of differing types and deviating positions of the first and second samples with respect to the color sensor. Various embodiments described below were developed in an effort to reduce or eliminate the effects such events have on color sensing.

Figure 1:
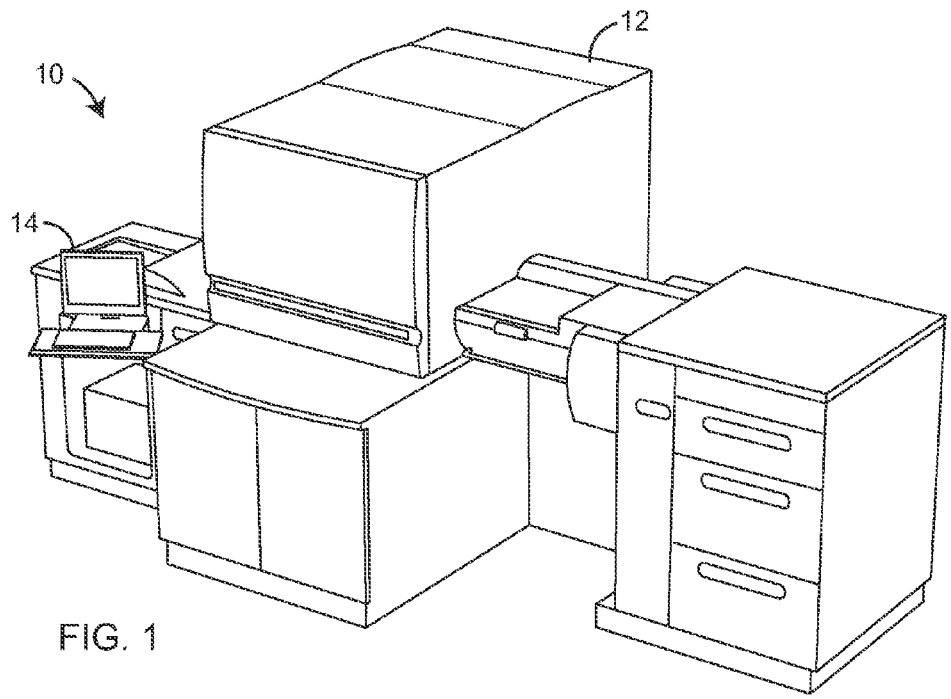
FIGS. 1 and 2 are exemplary diagrams of an environment in which various embodiments may be implemented according to an embodiment.
Figure 2:
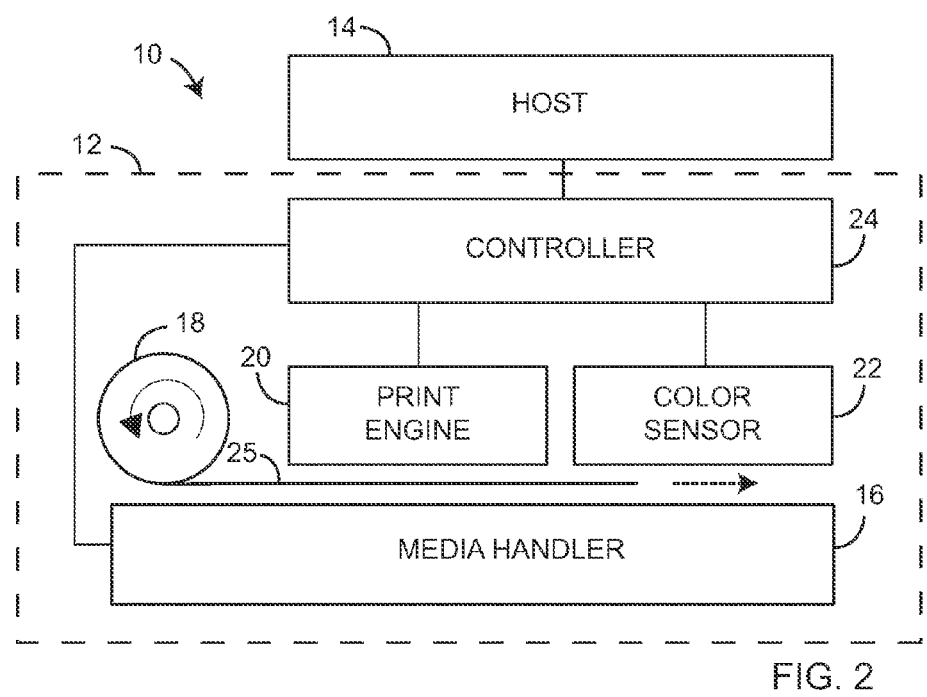

Environment: FIGS. 1-2 depict an exemplary environment 10 in which various embodiments may be implemented. Starting with FIG. 1, environment 10 is shown to include printing system 12 and host 14. Printing system 12 represents generally an assembly of components configured to produce printed images of print media. Printing system 12, for example, may be used for printing photographs, forms, advertisements, lottery tickets, and the like. Host 14 represents generally any computing device capable communicating print jobs to print system 12. Host 14 may also supply a user interface allowing a user obtain status information and to configure printing system 12. While shown as a larger scale printer, printing system 12 may instead be a smaller scale personal printer.

FIG. 2 is an exemplary block diagram of environment 10. In this example, printing system 12 is shown to include media handler component 16, media source 18, print engine 20, color sensor 22, and controller 24. Media handler 16 represents generally any component capable of transporting print media through print system 12. Print media may include paper sheets, a continuous web, or any other media on which a print image can be formed. Media source 18 represents generally any component configured to supply a print medium 25. In this example print medium 25 is depicted as a continuous web. In other implementations, print medium 25 can take any one of any number of possible forms. Print engine 20 represents generally any component capable of being utilized to form desired images on print medium 25. In a given example, print engine 20 may include a print head configured to dispense ink. In another example, print engine 20 may be configured to fuse toner to print media 25. Color sensor 22, described in more detail below, represents generally a component configured to be utilized to identify a color of a sample formed on print medium 25. The sample, for example, may be an image or portion thereof formed by print engine 20 on print medium 25.

Controller 24 represents generally any combination of hardware and programming capable of guiding and coordinating the operation of media handler 16, print engine 20, and color sensor 22. In particular, controller 24 is responsible for communicating commands to print component 20 and color sensor 22. Commands communicated by controller 24 can include both directives to perform a particular tasks as well as status queries. A status query may direct print engine 20 to report errors or warnings as well and other status information related to consumable usage and levels for items such as ink or toner. A given directive may cause print engine 20 to form desired images on print medium 25. Another directive may cause color sensor 22 to produce an output indicative of a color of a sample formed on print medium 25. Controller 24 is responsible for analyzing that output to identify the color.

Figure 3:
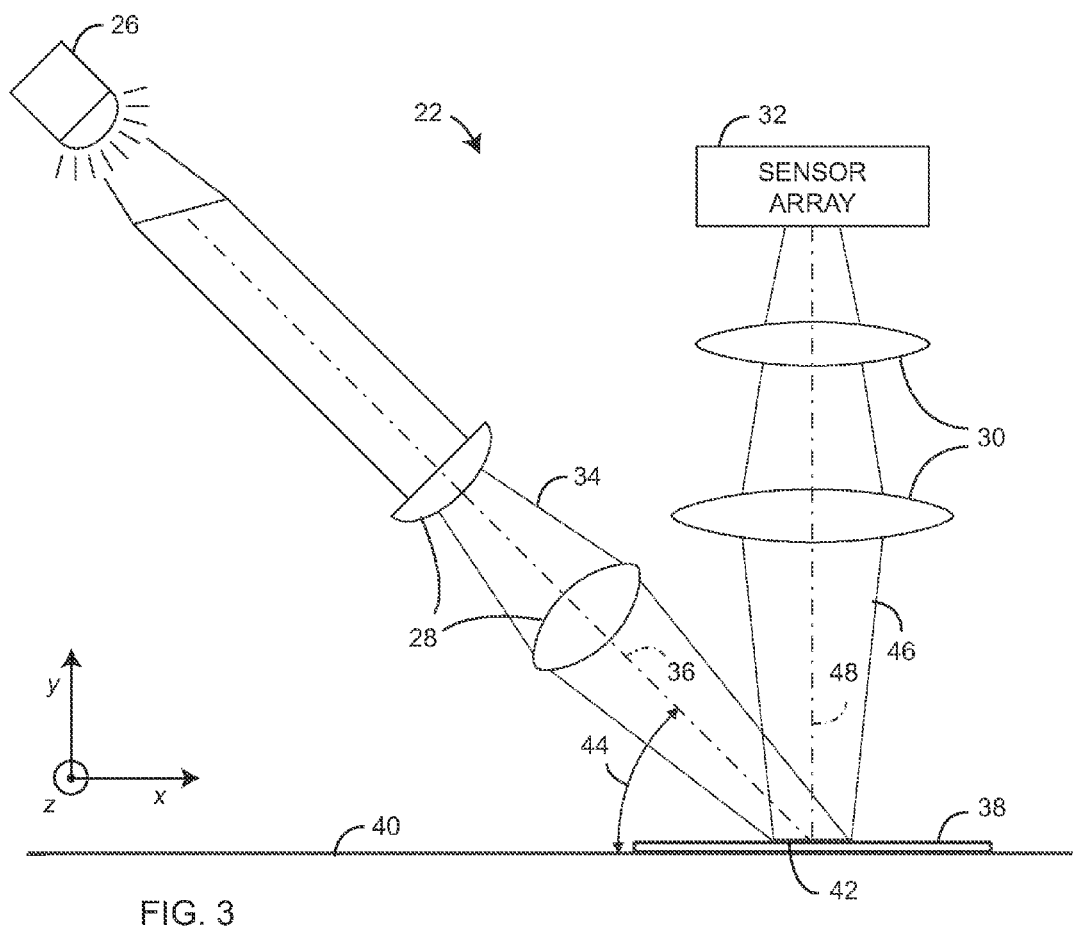
FIG. 3 is a schematic side view of an exemplary color sensor according to an embodiment.

Color Sensor: FIG. 3 is an exemplary schematic side view of an exemplary color sensor 22 according to an embodiment. Color sensor 22 is shown to include illumination source 26, projection optics 28, collection optics 30, and sensor array 32. Illumination source 26 represents generally any component capable of producing a light beam 34. First optics 28 represents generally any combination of optical elements configured to project light beam 34 along projection axis 36 onto sample 38. Projection axis 36 represents the axis along which light beam 34 is projected between first optics 28 and sample 38. Sample 38 represents generally a printed image or portion thereof formed on print medium 40.

Projected light beam 34 forms a spot 42 on sample 38. Light is reflected from sample 38. Second optics 30 represents any combination of optical elements configured to collect, along reflection axis 48, light 46 reflected from sample 38 directing the collected light 46 onto sensor array 32. Reflection axis 48 represents the axis along which light reflected from sample 38 is directed to sensor array 32. In the example of FIG. 3, the x,y axes define the surface of the page. The z axis extends into and out of the page. Projection axis 36 and reflection axis 48 define an illumination plane.

Sensor array 32 represents a plurality of sensors each configured to generate an output indicative of whether or not a given sample is of a particular color. The combined output of the sensors can then be analyzed to identify the actual color of sample 38. In a given example, each of the sensors may be a photodiode filtered to accept light of a given wavelength range. For example, one sensor may be filtered to detect primarily the color red, another sensor may be filtered to detect primarily green, and so on.

Figure 4:
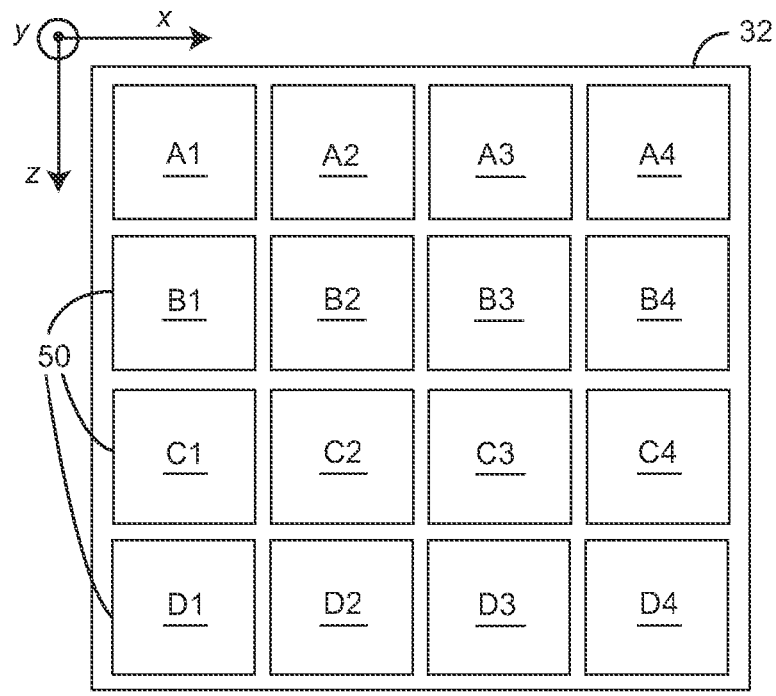
FIG. 4 is an exemplary schematic view of a sensor array.
Figure 5:
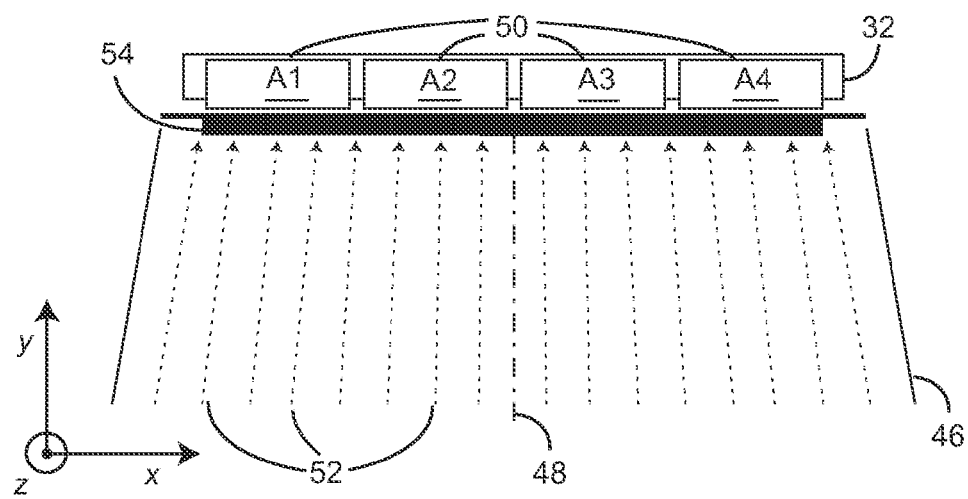
FIG. 5 is an exemplary schematic side view of the sensor array of FIG. 4.

FIG. 4 is a bottom up schematic view of an exemplary sensor array 32. In FIG. 4, the x,z axes define the surface of the page while the y axis extends into and out of the page. As depicted, sensor array 32 includes a grid of sensors 50. The grid of sensors includes sensors labeled as A1, A2, A3, A4, B1, B2, B3, B4, C1, C2, C3, C4, D1, D2, D3, and D4. Moving to FIG. 5, sensor array 32 is shown from a side view in which light 52 is directed along reflection axis 48 onto sensors 50. In FIG. 5, the x,y axes define the surface of the page while the z axis extends into and out of the page. In this example light 52 is distributed in a pattern across sensors 50 labeled as A1, A2, A3, and A4. The distribution is indicated by spot 54 of light 52 directed onto sensor array 32.

A number of factors can affect how light is directed onto sensor array 32 about sensors 50. Referring to FIG. 3, collection optics 30, for example, may be configured to collect light reflected by a certain type of print media positioned at a particular distance away from sensor array 32. Differing print media types such as glossy and matte have differing scattering profiles meaning that light reflects differently from each. Thus, collection optics 30 may distribute the collected light 52 on sensor array 32 reflected from a matte print medium differently than a glossy print medium. Further, sample 38 may, for a number of reasons, be positioned closer to sensor array 32 than expected resulting in a different distribution of collected light 52 as a function of media position.

Figure 6:
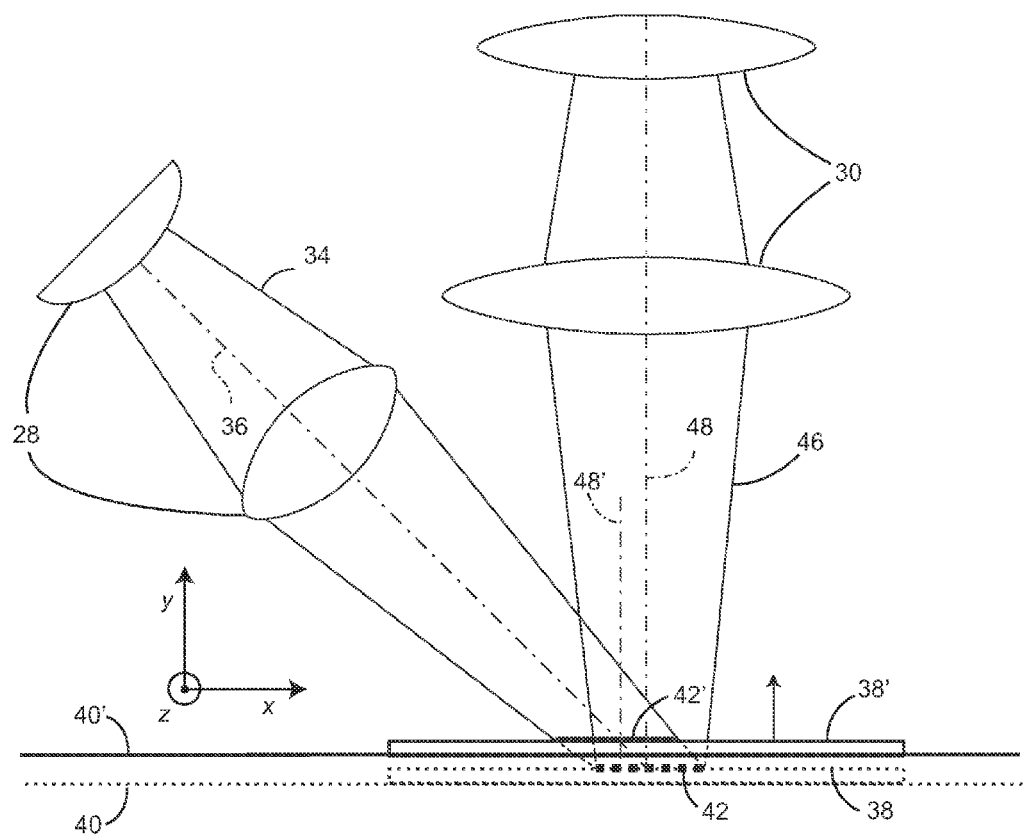
FIG. 6 is a partial schematic side view of a color sensor showing a displacement of a print medium.

In FIG. 6, a differing distribution is caused by a shift in expected position of a sample 38 with respect to position of collection optics 30 and color sensor 32 (not shown). Here, the expected position of sample 38 is indicated in dashed lines, while the actual position of sample 38' is shown in solid lines. As depicted, sample 38' is positioned closer to collection optics 30 than expected. Thus, spot 42' of light beam 34 directed onto sample 38' is positioned closer to collection optics 30 than expected as well as shifted laterally in the field of view of the collection optics 30. The change in expected position may, for example be caused by use of a thicker print medium 40' or by a buckle formed in print medium 40'. The change in expected position of sample 38' causes collection optics 30 to direct reflected light 46 in an unexpected manner resulting in a different distribution of light across color sensor 32 than it would if the media were in a nominal position such as that shown in FIGS. 3 and 5.

Figure 7:
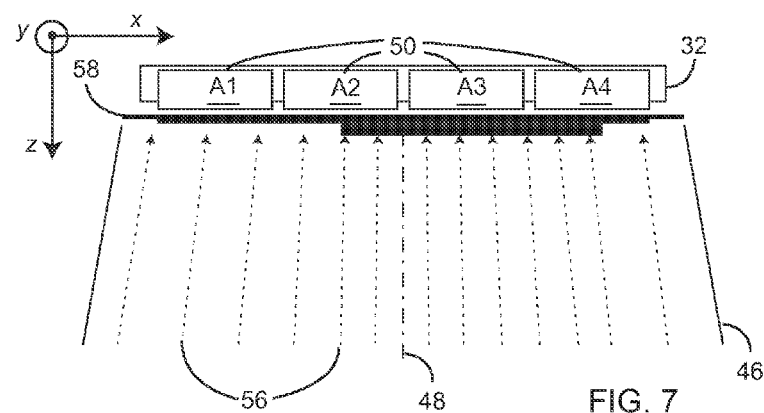
FIG. 7 is an exemplary schematic side view of the sensor array of FIG. 4.

FIG. 7 depicts an example of a differing distribution. Like FIG. 5, FIG. 7 depicts sensor array 32 from a side view in which light 56 is directed along reflection axis 48 onto sensors 50. In FIG. 7, the x,y axes define the surface of the page while the z axis extends into and out of the page. In this example light 56 is distributed unevenly across sensors 50. The uneven distribution is indicated by spot 58 of light 56 directed onto sensor array 32. Here, the intensity of light 56 on sensor 50 labeled A3 is greater than the intensity of light directed onto sensors 50 labeled A1, A2, and A3. The intensities of light on sensors 50 labeled A2 and A4 are greater than the intensity of light 56 on sensor 50 labeled A1.

Comparing FIGS. 5 and 7, assume sensor 50 labeled A1 is a filtered photodiode configured for use in detecting a particular color of light. Assuming that a sample of that color is formed on a print medium, light 54 in FIG. 5 is directed onto that sensor A1 in a manner allowing sensor A1 to produce an output indicative of that color. The output of sensor A1 in the example of FIG. 6 would differ causing the identified color to differ from that which was actually formed on the print medium.

Figure 8:
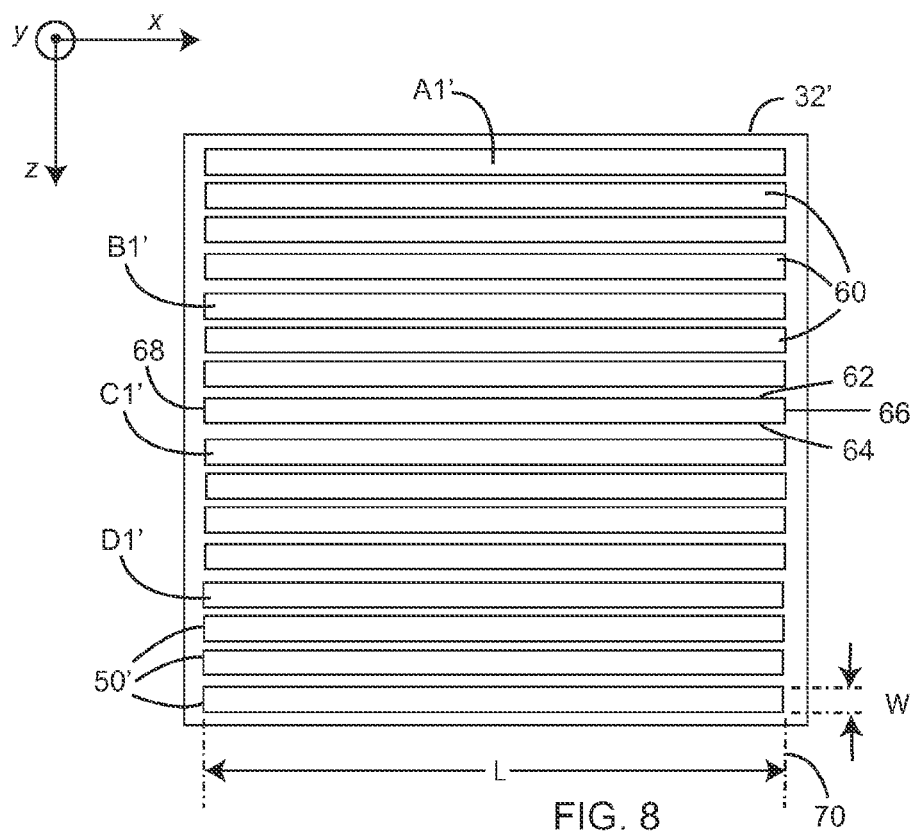
FIG. 8 is an exemplary schematic view of a sensor array according to an embodiment.

FIG. 8 is a bottom up schematic view of an exemplary sensor array 32'. In FIG. 8, the x, z axes define the surface of the page while they axis extends into and out of the page. As depicted, sensor array 32' includes a plurality of sensors 50'. Each sensor 50' has a length dimension (L) that is elongated with respect to a width dimension (W). The sensors 50' can come in groups labeled as B1', C1', and D1'. The length dimensions (L) of sensors 50' are substantially equal and aligned to be parallel with the illumination plane defined by the x, y axes. Each sensor 50' has a face 60 defined by first and second elongated sides 62 and 64 and first and second opposing non-elongated sides 66 and 68. The first non-elongated sided 66 of sensors 50' are aligned along an axis 70 parallel to the z axis and perpendicular to the illumination plane (the plane defined by the x,y axes).

Figure 9:
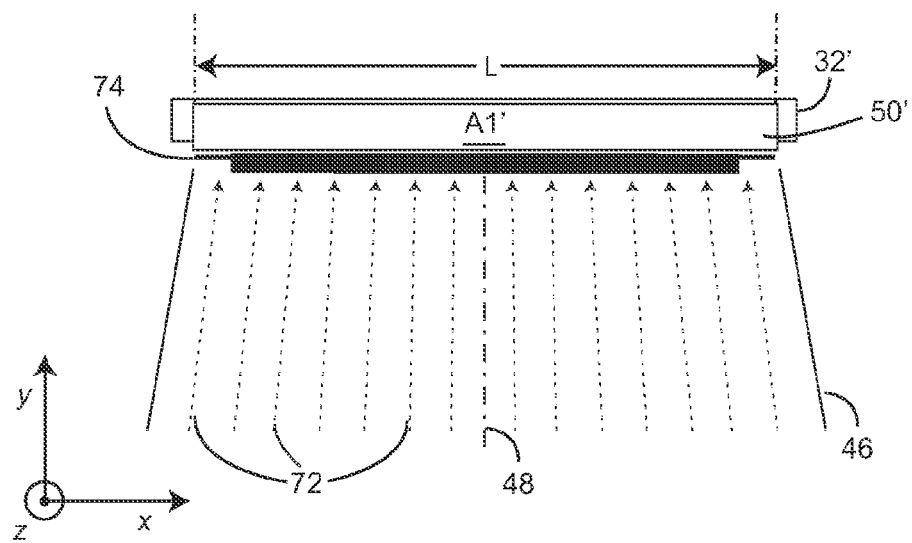
FIGS. 9-10 are exemplary schematic side views of the sensor array of FIG. 8.

Moving to FIG. 9, sensor array 32 is shown from a side view in which light 72 is directed along reflection axis 48 onto sensors 50'. In FIG. 9, the x,y axes define the surface of the page while the z axis extends into and out of the page. In this example light 72 is distributed evenly across sensor 50' labeled A1'. The even distribution is indicated by spot 74 of light 72 on sensor array 32'.

Figure 10:
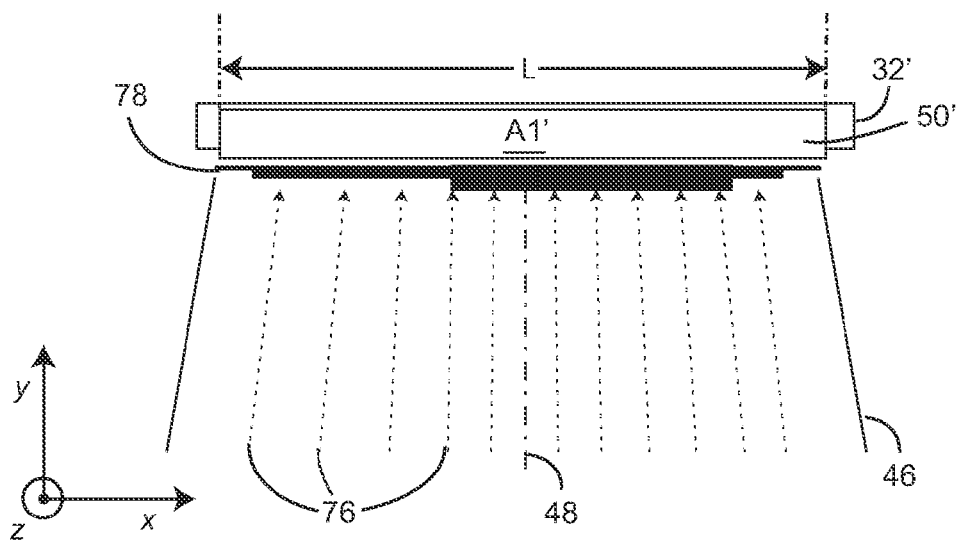

As previously discussed, a number of factors can affect how light is directed onto sensor array 32'. FIG. 10 depicts an example of uneven distribution. Like FIG. 9, FIG. 10 depicts sensor array 32' from a side view in which light 76 is directed along reflection axis 48 onto sensor 50' labeled A1'. In FIG. 10, the x,y axes define the surface of the page while the z axis extends into and out of the page. In this example light 76 is distributed unevenly across sensor 50'. The uneven distribution is indicated by spot 78 of light 76 directed onto sensor array 32'.

Here, while light 76 is unevenly distributed, the uneven distribution, at least along the x axis, falls entirely on sensor 50' labeled A1'. Comparing FIGS. 9 and 10, Sensor 50' labeled A1' in each example collects substantially the same light intensity although the distribution of that light differs. Because the intensity or the overall amount of light collected in each example is substantially the same, the output of sensor 50' in the examples of FIGS. 9 and 10 is also substantially the same. Assume sensor 50' labeled A1' is a filtered photodiode configured for use in detecting a particular color of light and that a sample of that color is formed on a print medium. Light 74 in FIG. 9 is directed onto sensor 50' labeled A1' in a manner allowing sensor A1' to produce an output indicative of that color. The output of sensor A1' in the example of FIG. 10 would be substantially the same causing the identified color to be substantially the same as that which was actually formed on the print medium. In other words, even though the distributions differ between FIGS. 9 and 10, the outputs of sensor 50' labeled A1' remain substantially the same. Thus, the colors identified using those outputs are substantially the same.

Figure 11:
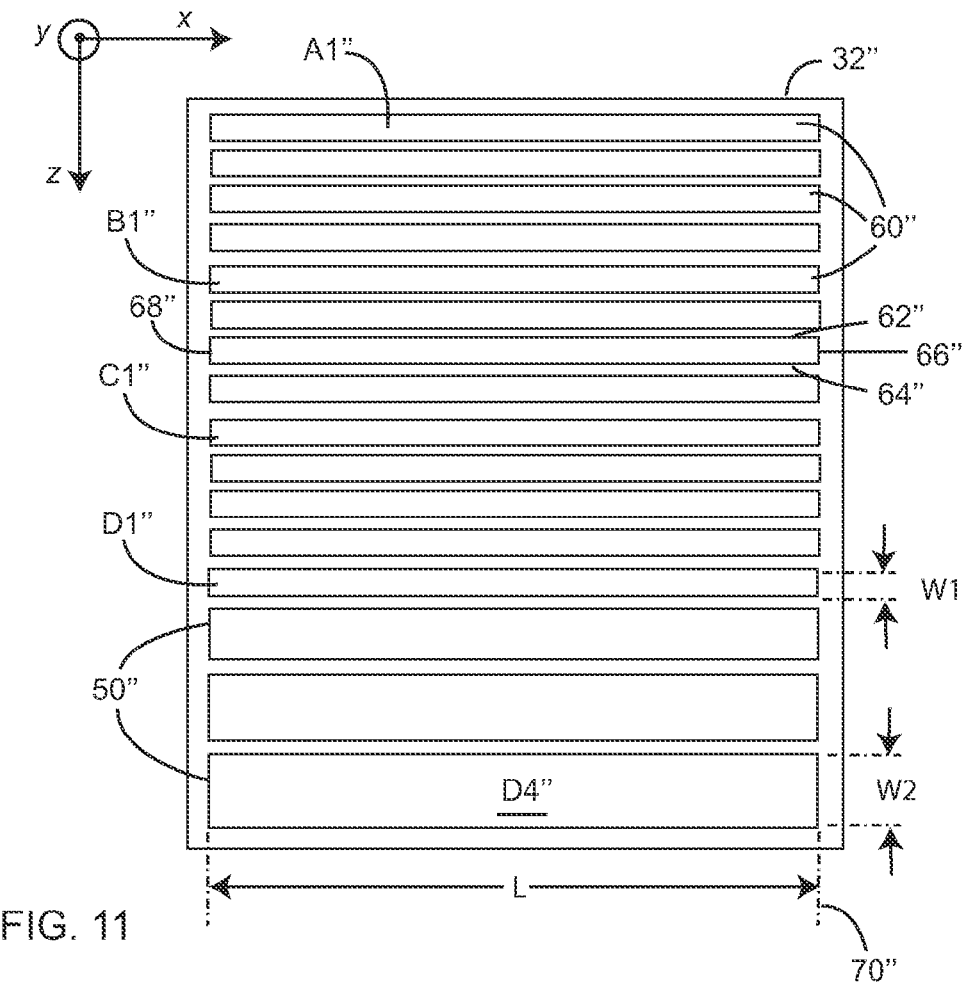
FIG. 11 is an exemplary schematic view of a sensor array according to an embodiment.

FIG. 11 is a bottom up schematic view of an exemplary sensor array 32". In FIG. 11, the x,z axes define the surface of the page while the y axis extends into and out of the page. As depicted, sensor array 32" includes a plurality of sensors 50". Each sensor 50" has a length dimension (L) that is elongated with respect to a width dimension. The length dimensions (L) of sensors 50" are substantially equal and aligned to be parallel with the illumination plane defined by the x,y axes. Each sensor 50" has a face 60" defined by first and second elongated sides 62" and 64" and first and second opposing non-elongated sides 66" and 68". The first non-elongated sided 66" of sensors 50" are aligned along an axis 70" parallel to the z axis of FIG. 11 and perpendicular to the illumination plane (the plane defined by the x, y axes).

Sensors 50" are shown to have varying width dimensions. In particular, sensor 50" labeled D1" is shown to have a width dimension W1 while sensor 50" labeled D4" is shown to have a width dimension W2 that is greater than W1. Additional sensor groups of varying or uniform size are labeled as B1" and C1". Referring back to FIG. 3, illumination source 26 may generate a broad spectrum of light. However, certain color components of that light may be less intense than others. For example, illumination source may incorporate a light emitting diode capable of producing a white light with a low intensity of blue compared to the intensity of another color such as yellow. In other words, the generated light includes a spectrum of wavelengths. The intensity of the light at the blue wavelength is less than the intensity of the light at the yellow wavelength. Sensor 50" labeled as 01", in this example, is filtered to detect yellow light, while sensor 50" labeled as 04" is filtered to detect blue light. The width dimension (W2) of sensor 50" labeled as 04" is enlarged compared to width dimension (W1) of sensor 50" labeled as 01". The increased width enlarges the surface area for collecting blue light. Thus, sensor 50" labeled as 04" is area scaled to equalize its output with the output of sensors 50" labeled as 01.

Figure 12:
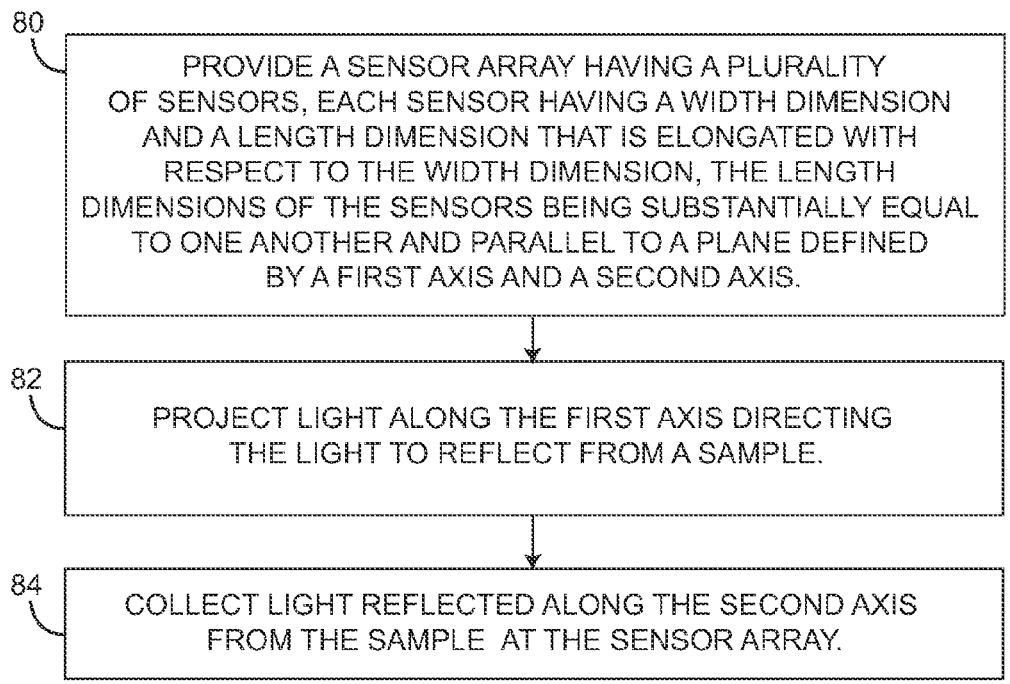
FIG. 12 is a flow diagram depicting a method implementation according to an embodiment.

Operation: FIG. 12 is an exemplary flow diagram depicting steps taken to implement an embodiment. In discussing FIG. 12, reference is made to the diagrams of FIGS. 3-11. These references are made to provide contextual examples. Implementation, however, is not limited to those examples. A sensor array with a plurality of sensors is provided (step 80). Each sensor has a width dimension and a length dimension that is elongated with respect to the width dimension. The length dimensions of the plurality of sensors are substantially equal to one another and parallel to a plane defined by a first axis and a second axis. Sensor arrays 32' and 32" of FIGS. 8 and 11 are examples of the sensor array provided in Step 80. Referring to FIG. 3, projection axis 36 is an example of the first axis of step 80 while collection axis 48 is an example of the second axis. The illumination plane discussed with respect to FIG. 3 is an example of the plane of step 80.

A light beam is projected along the first axis (step 82). The light beam is directed to reflect from a sample. In one implementation, that sample may be formed on a print medium. Light reflected from the sample along the second axis is collected at the sensor array (step 84). Referring back to FIG. 3, step 82 may be accomplished by projection optics 28 which directs light beam 34 along projection axis 36 onto sample 38. Step 84 may be accomplished by collection optics 30 which directs light reflected along collection axis 48 from sample 38 onto sensor array 32.

In a given implementation collecting in step 84 includes directing a spot of the reflected light on the sensor array provided in step 80. The length dimension of each sensor of the provided sensor array is substantially equal to or greater than a diameter of that spot. Sensor arrays 32' and 32" of FIGS. 9 and 11 provide examples in which the length dimensions of sensors 50' and 50" are equal to or greater than the diameters of spots 74 and 78.

Each sensor of the sensor array provided in step 80 can include a face defined by opposing first and second non-elongated sides and first and second elongated sides. The first non-elongated sides of the sensors are aligned with one another along a third axis that is perpendicular to the second axis. Sensor arrays 32' and 32" of FIGS. 9 and 11 provide examples in which the first non elongated ends 66' and 66" are aligned along axes 70 and 70" respectively. Note that axes 70 and 70" are perpendicular to the x and y axes.

The light beam projected in step 82 may include a first component of a first wavelength range and a first intensity and a second component of a second wavelength range and a second intensity that is greater than the first intensity. In this example, providing in step 80 includes providing a sensor array having a plurality of sensors. A first of the plurality of sensors is filtered for the first wavelength range, and a second of the plurality of sensors is filtered for the second wavelength range. The first of the plurality of sensors has a width dimension that is greater than a width dimension of the second of the plurality of sensors. Sensor array 32" of FIG. 11 provides an example. Sensor 50" labeled as D1" has a width dimension W1. Sensor 50" labeled as D4" has a width dimension W2 that is greater than W1. In other words, sensor 50" referenced as D4" is area scaled to equalize its output with the other sensors 50" of sensor array 32".

Collecting in step 84 can include collecting, at the sensor array provided in step 80, light reflected from a first sample formed on a first print medium of a first type and then collecting light reflected from a second sample formed on a second print medium of a second type different than the first type. The first and second samples are of substantially the same color. However, the light reflected from the first sample has a first scattering profile, and the light reflected from the second sample has a second scattering profile different than the first scattering profile. A first output of the sensor array corresponding to the light reflected from the first sample is analyzed to identify a first color. A second output of the sensor array corresponding to the light reflected from the second sample is analyzed to identify a second color. Despite the differing scattering patterns of the two print media types, the identified second color is substantially identical to the identified first color. The result is due at least in part to the orientation and elongation of the sensors.

Collecting in step 84 can include collecting, at the sensor array provided in step 80, light reflected from a first sample formed on a first print medium. The sample is positioned, along the second axis, a first distance from the sensor array. Subsequently, light reflected from a second sample formed on a second print medium is collected. The second sample is positioned, along the second axis, a second distance from the sensor array. That second distance is less than the first distance, and the first and second samples are of substantially the same color. A first output of the sensor array corresponding to the light reflected from the first sample is analyzed to identify a first color. A second output of the sensor array corresponding to the light reflected from the second sample is analyzed to identify a second color. Despite the differing positions of the two samples, the identified second color is substantially identical to the identified first color. The result is due at least in part to the orientation and elongation of the sensors.

Conclusion: The printing system 12 shown in FIGS. 1 and 2 is an exemplary device in which embodiments of the present invention may be implemented. Implementation, however, is not so limited. Embodiments can be implemented in any environment in which it is desirable to identify a color of a sample. The diagrams of FIGS. 3-11 show the architecture, functionality, and operation of various embodiments. The block controller 24 in FIG. 2 is defined in part as a program. Controller 24 may represent, at least in part, a module, segment, or portion of code that comprises one or more executable instructions to implement the specified logical function(s). Controller 26 may also represent a circuit or a number of interconnected circuits to implement the specified logical function(s).

Although the flow diagram of FIG. 12 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A color sensor array, comprising a plurality of sensors, wherein:
   each of the plurality of sensors has a width dimension and a length dimension that is elongated with respect to the width of dimension, the length dimensions of the sensors being substantially equal to another and parallel to an illumination plane;
   each of the plurality of sensors includes a face defined by opposing first and second elongated sides and opposing first and second non-elongated sides, the first non-elongated sides of the plurality of sensors being aligned with one another along an axis that is substantially perpendicular to the illumination plane; and
   wherein the color sensor array is positioned such that a spot of light from the illumination plane is focused to a width that is less than the length dimension of each of the plurality of sensors.

2. The sensor array of claim 1, wherein a first of the plurality of sensors is filtered for a first wavelength range and a second of the plurality of sensors is filtered for the second wavelength range, the first if the plurality of sensors having a width dimension that is greater than a width dimension of the second of the plurality of sensors.

3. A color sensor, comprising an illumination source, first optics, second optics, and a sensor array, wherein:
   the sensor array includes a plurality of sensors, each sensor having a width dimension and a length dimension that is elongated with respect to the width dimension, the length dimensions of the sensors being substantially equal to one another and parallel to a plane defined by a first axis and a second axis;
   the illumination source is configured to produce a light beam;
   the first optics is configured to project the light beam along the first axis onto a sample;
   the second optics is configured to collect, along the second axis, light reflected from the sample, and focus the collected light onto the plurality of sensors in a spot of light with a diameter less than the length dimensions of each sensor.

4. The color sensor of claim 3, wherein each sensor includes a face defined by opposing first and second elongated sides and first and second non-elongated sides, the first non-elongated sides of the plurality of sensors being aligned with one another along a third axis that is substantially perpendicular to the second axis.

5. The color sensor of claim 4, wherein:
   the illumination source is configured to project light that includes a first component and a second component, the first component being of a first wavelength range and a first intensity, the second component being of a second wavelength range and a second intensity that is greater than the first intensity; and
   a first of the plurality of sensors is filtered for the first wavelength range and a second of the plurality of sensors is filtered for the second wavelength range, the first of the plurality of sensors having a width dimension that is greater than a width dimension of the second of the plurality of sensors.

6. A color sensing method, comprising:
   providing a sensor array having a plurality of sensors, each sensor having a width dimension and a length dimension that is elongated with respect to the width dimension, the length dimensions of the sensors being substantially equal to one another and parallel to a plane defined by a first axis and a second axis;
   projecting a light beam along the first axis directing the light beam onto a sample formed on a print medium;
   collecting light reflected along the second axis from the sample at the sensor array; and
   focusing the collected light onto the plurality of sensors in a spot of light with a diameter less than the length dimensions of each sensor.

7. The method of claim 6, wherein providing comprises providing a sensor array having a plurality of sensors, wherein each sensor includes a face defined by opposing first and second elongated sides and first and second non-elongated sides, the first non-elongated sides of the plurality of sensors being aligned with one another along a third axis that is substantially perpendicular to the second axis.

8. The method of claim 7, wherein:
   projecting a light beam light comprises projecting a light beam that includes a first component and a second component, the first component being of a first wavelength range and a first intensity, the second component being of a second wavelength range and a second intensity that is greater than the first intensity; and
   providing comprises providing a sensor array having a plurality of sensors, wherein a first of the plurality of sensors is filtered for the first wavelength range and a second of the plurality of sensors is filtered for the second wavelength range, the first of the plurality of sensors having a width dimension that is greater than a width dimension of the second of the plurality of sensors.

9. The method of claim 6, wherein collecting comprises:
   collecting, at the sensor array, light reflected from a first sample formed on a first print medium of a first type; and
   collecting, at the sensor array, light reflected from a second sample formed on a second print medium of a second type different than the first type;
   wherein the first and second samples are of substantially the same color, the light reflected from the first sample has a first scattering profile and the light reflected from the second sample has a second scattering profile different than the first scattering profile.

10. The method of claim 9, further comprising:
    analyzing a first output of the sensor array corresponding to the light reflected from the first sample to identify a first color; and analyzing a second output of the sensor array corresponding to the light reflected from the second sample to identify a second color, the identified second color being substantially identical to the identified first color.

11. The method of claim 6, wherein collecting comprises:

collecting, at the sensor array, light reflected from a first sample formed on a first print medium, the sample being positioned, along the second axis, a first distance from the sensor array; and collecting, at the sensor array, light reflected from a second sample formed on a second print medium, the second sample being positioned, along the second axis, a second distance from the sensor array;

wherein the second distance is less than the first distance and the first and second samples are of substantially the same color.

12. The method of claim 11, further comprising:

analyzing a first output of the sensor array corresponding to the light reflected from the first sample to identify a first color; and analyzing a second output of the sensor array corresponding to the light reflected from the second sample to identify a second color, the identified second color being substantially identical to the identified first color.

\* \* \* \* \*